Jan. 1, 1957  C. C. REIFF  2,776,026
LUBRICANT FITTING
Filed Aug. 3, 1953  2 Sheets-Sheet 1
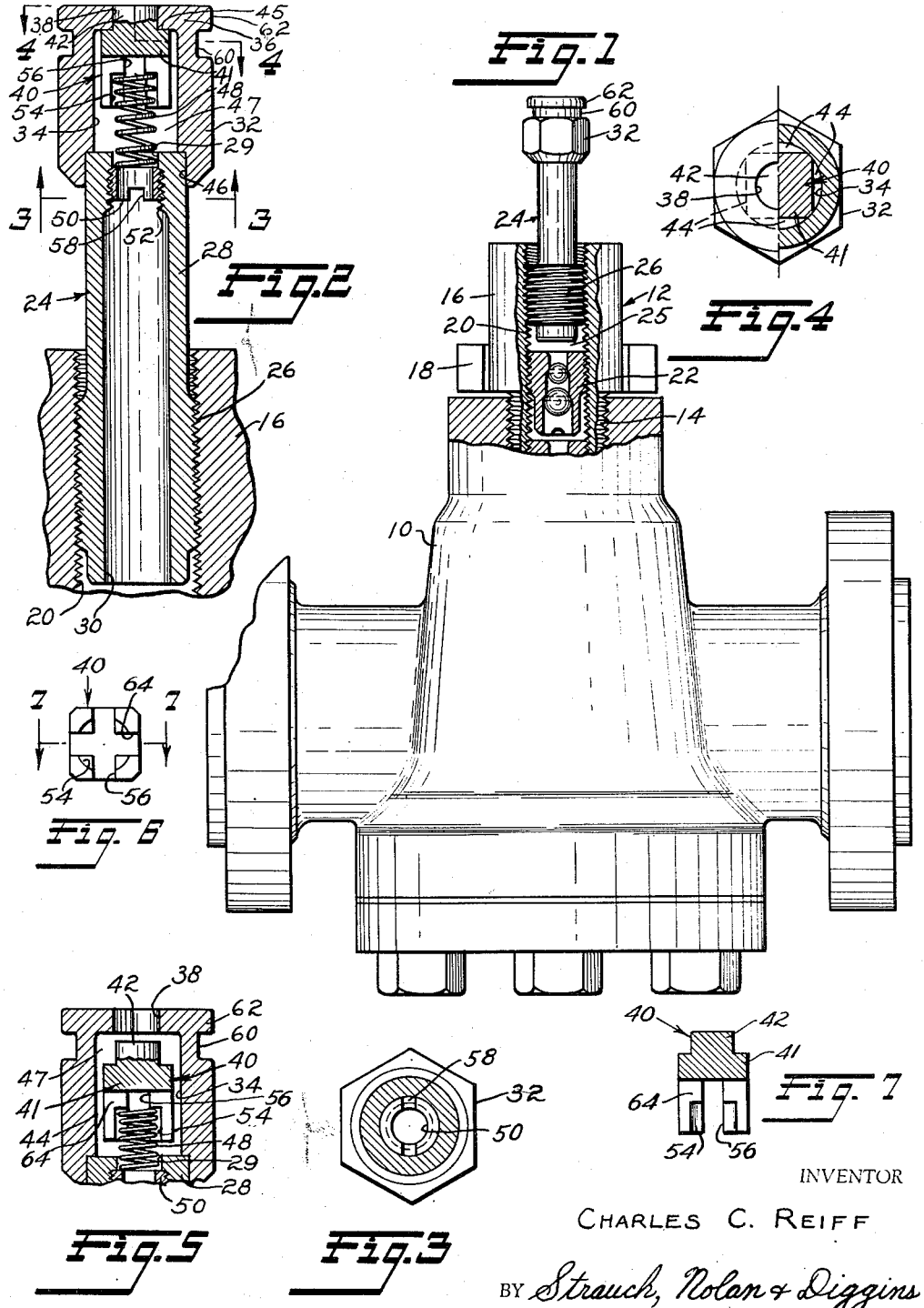
INVENTOR
CHARLES C. REIFF
BY Strauch, Nolan & Diggins
ATTORNEYS

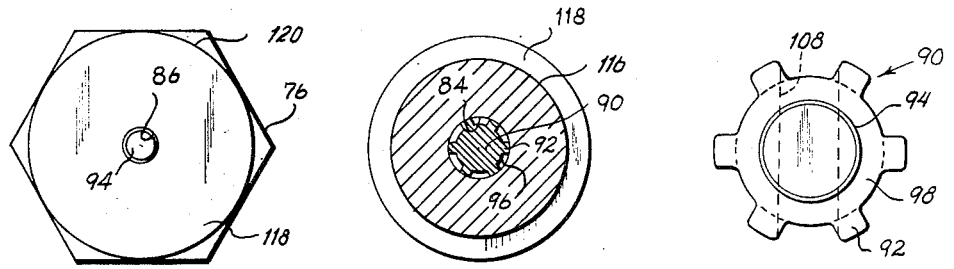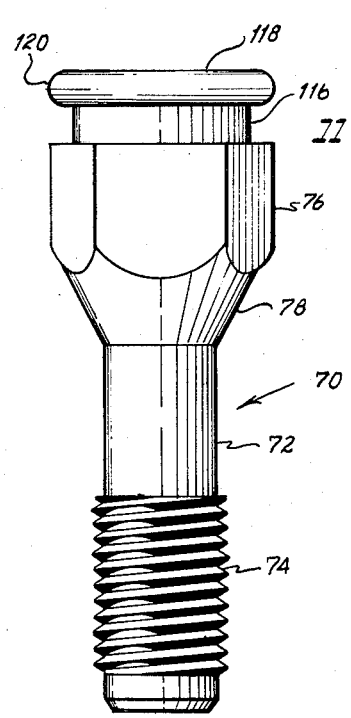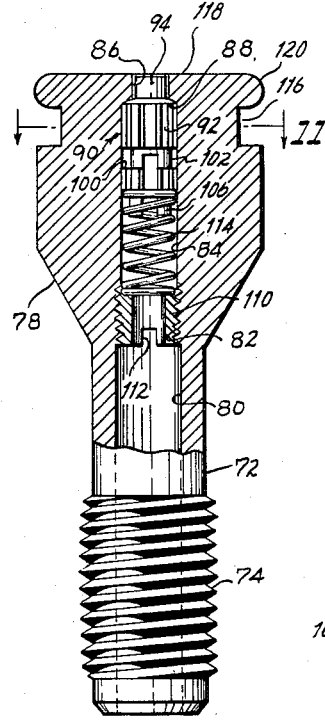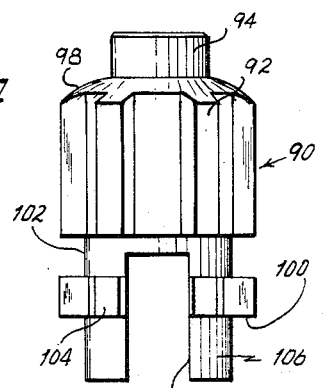

United States Patent Office 2,776,026
Patented Jan. 1, 1957

2,776,026

LUBRICANT FITTING

Charles C. Reiff, Wadsworth, Ohio, assignor to Rockwell Manufacturing Company, Pittsburgh, Pa., a corporation of Pennsylvania Application August 3, 1953, Serial No. 371,884

7 Claims. (Cl. 184—105)

The invention relates to lubricated valves and more particularly relates to improvements in lubricant fittings for introducing plastic lubricant into such valves, and is a continuation-in-part of my copending application Serial No. 304,168, filed August 13, 1952, for Lubricant Fitting now abandoned.

Lubricated plug valves in general use today are provided with lubricant reservoirs either in the valve plug or valve body. The reservoir is preferably connected through a check valve to the lubricant distribution passages and grooves of the valve. To force lubricant from the reservoir through the check valve to lubricate the valve, a lubricant screw is usually threadedly mounted in the valve part containing the lubricant reservoir and exerts pressure on the lubricant in the reservoir when threaded into the valve part to force lubricant from the reservoir to the distribution passages of the valve. This lubricant screw is preferably provided externally with a non-circular head to which a wrench may be applied for the periodic rotation of the screw to pressurize the lubricant in the reservoir and thereby lubricate the valve.

In some installations, the valve is lubricated by removing the lubricant screw, dropping a stick of plastic lubricant into the reservoir, and then replacing and tightening the lubricant screw until the system is under pressure. In such installations the lubricant screw may be a solid element. In other installations, the lubricant screw which is threadedly mounted in the valve plug body is a hollow fitting having a check valved inlet whereby lubricant may be introduced into the reservoir under pressure developed by a grease gun, as illustrated in United States Reissue Letters Patent No. 19,041 issued January 9, 1934, to J. C. Martin, Jr. for Plug Cock and Lubricating Means Therefor.

The present invention constitutes an improvement over the type of fitting disclosed by the Martin patent.

According to the present invention the lubricant introduction fitting is a unitary tube assembly wherein an improved check valve is mounted in the tube for operation in a novel manner, the whole constituting an assembly which is easily and inexpensively fabricated.

It is a major object of the invention to provide a novel hollow lubricant introducing fitting for valves and the like comprising an integral hollow screw provided at its outer end with a special valve construction.

A further object of the invention is to provide a novel lubricant screw fitting embodying a check valve structure wherein a spring biased valve element is mounted in a chamber in the fitting and wherein an improved and simplified lubricant channel arrangement is provided for permitting lubricant flow through the chamber even when such spring is fully compressed.

It is a further object of this invention to provide a novel lubricant introducing fitting for lubricated valves and the like having an integral non-circular cross-section tool attaching head surrounding the check valve.

Still another object of this invention is to provide a unitary lubricant screw fitting embodying an improved removable check valve structure.

Yet another object of this invention is to provide a lubricant screw fitting formed from a single member by simple and inexpensive manufacturing methods and embodying an improved resiliently mounted removable check valve structure.

An additional object of this invention is to provide a lubricant screw fitting embodying a novel unidirectional check valve structure for assuring a free flow of lubricant to the fitting and for preventing inadvertent loss of lubricant from the fitting.

Yet a further object of this invention is to provide a lubricant screw fitting with an internally threaded portion and oppositely extending axially aligned bores connected to the threaded portion substantially equal to the major and minor diameter of the threaded portion, respectively, and an improved spring closed removable check valve structure mounted in one of said bores which assures free flow of lubricant to the fitting even when the spring is fully compressed.

It is a further object of this invention to provide a novel lubricant screw fitting, as for lubricated valves, in which an enlarged wrench receiving body portion of non-circular cross-section that is initially a member separate from the shank of the screw houses a check valve and is permanently and integrally secured to the screw shank in fluid tight relation therewith as by brazing to form a rugged unitary structure.

A further object of the invention is to provide a novel hollow lubricant screw fitting having a check valve in its upper end wherein the movable valve element is permanently enclosed and wherein a spring or like resilient member for biasing the valve element to closed position is inserted through the hollow screw and held by a removable fastener.

The foregoing and other objects of this invention will become more fully apparent by reference to the appended claims and as the following detailed description thereof proceeds in reference to the accompanying drawings wherein:

Figure 1 is a front elevation partially broken away and in section of a lubricated plug valve provided with a fitting according to one embodiment of the invention;

Figure 2 is a longitudinal sectional view of the lubricant fitting of the invention showing the check valve of Figure 1 in its normally closed position;

Figure 3 is a transverse section of the lubricant fitting of Figure 2 taken substantially along line 3—3 of Figure 2;

Figure 4 is an irregular section partially in elevation of the lubricant fitting of Figure 2 taken substantially along the line 4—4 of Figure 2;

Figure 5 is a fragmentary longitudinal sectional view of the upper end of the lubricant fitting of Figure 2 exaggeratedly illustrating the check valve of the fitting in its open position, as when lubricant is being introduced under pressure;

Figure 6 is a bottom end view of the valve element;

Figure 7 is a longitudinal sectional view of the valve element of the assembly taken along the line 7—7 of Figure 6;

Figure 8 is an elevational view of a further embodiment of the improved lubricant fitting of this invention;

Figure 9 is a longitudinal sectional view of the lubricant fitting of Figure 8 showing the check valve in its normally closed position;

Figure 10 is a top plan view of the lubricant fitting shown in Figure 8;

Figure 11 is a transverse sectional view taken substantially along the line 11—11 of Figure 9;

Figure 12 is an enlarged elevational view of the check valve shown in Figure 9;

Figure 13 is a top plan view of the check valve illustrated in Figure 12; and

Figure 14 is a bottom plan view of the check valve of Figure 12.

Referring now to the drawings and particularly to Figure 1 wherein is shown a valve assembly of the type disclosed in Nordstrom Patent No. 2,204,440 comprising a stationary body 10 within which is rotatably mounted a tapered plug (not shown) rotatable under the control of an operating stem 12 having portion 14 threadedly mounted in valve body 10 and suitably coupled to the plug. Stem 12 is provided with an integral head 16 of non-circular cross section for the reception of a wrench, or like tool, for rotation of stem 12 and upon which is fixed a suitable stop collar 18 to limit plug rotation to 90° in either direction.

Valve stem 12 is formed with a threaded bore 20 in the lower end of which is fixed a unidirectional check valve unit 22. A hollow lubricant screw fitting 24 externally threaded along its lower portion at 26 is threadedly received within the upper part of bore 20, as clearly seen in Figure 1. The threaded bore 20, lubricant screw 24, and the check valve assembly 22 define a lubricant reservoir 25 into which lubricant is discharged under control of pressure from or through lubricant screw 24 for lubricating the valve and jacking the plug from its seat.

The details of the construction of the special lubricant screw fitting 24 are best shown in Figures 2–4. Fitting 24 comprises a rigid tubular shank 28 externally threaded at 26 and formed with a smooth longitudinal through bore 30. At the upper end of shank 28 a larger diameter head 32 is secured, and head 32, along the major portion of its length, is of non-circular cross-section, as shown in Figures 3 and 4, for the reception of a wrench or other suitable tool.

The upper end of shank 28 is formed with an opening 29 coaxial with but smaller in diameter than bore 30. Head 32 is in the general form of a cap having a smooth central cylindrical bore 34 terminating at its upper end in wall 36 having a central coaxial aperture 38 of smaller diameter than bore 34. A valve element 40, the larger body portion 41 of which is of non-circular cross-section as illustrated in Figure 4, is slidably mounted within bore 34, by reason of its corners engaging the walls of bore 34, and is formed with an end boss 42 of a size and shape complementary to end wall aperture 38 into which it fits snugly as a closure when valve member 40 is in the closed position illustrated by Figure 2. The non-circular body portion 41 of the valve element coacts with the bore 34 of the member 32 to define a plurality of independent longitudinal lubricant passages 44, as shown in Figure 4.

So long as the valve element 40 is in the closed position illustrated in Figure 2 with boss 42 disposed within aperture 38, and with its shoulder 45 which is a continuous flat face normal to the axis of the fitting abutting the opposed flat internal face of end wall 36 around aperture 38, fluid communication through aperture 38 to the passage 44 is prevented.

In the embodiment illustrated in Figures 1 to 7, head 32 is formed with a shouldered recess 46 into which extends the adjacent end of the screw shank 28. In assembling this embodiment the valve element 40 is first mounted within the chamber 47 defined by bore 34 before shank 28 is fitted into recess 46. Then head 32 is permanently fixed to shank 28, as by brazing, to form a rigid unitary integral assembly between shank 28 and head 32 in which the valve element 40 is enclosed and cannot be accidentally separated.

After the brazing operation is completed, a resilient member 48, preferably a compressed coil spring of sufficiently small cross section, is inserted through bore 30, opening 29 and into bore 34 so that one end of the spring is in abutment with the end of valve element 40. After insertion of spring 48, an externally threaded centrally apertured retainer 50 is fixedly mounted in opening 29 on the internal threads 52 in engagement with the other end of spring 48 to compress spring 48 and thereby bias valve element 40 toward its closed position illustrated in Figure 2. The valve element 40 is preferably formed with a piloting end recess 54 into which the adjacent end of spring 48 extends to assure a proper alignment between spring 48 and valve element 40. Spring retainer 50 is formed with slots 58 accessible to a screw driver thrust into bore 30, and the diameter of spring 48 is small enough to permit its insertion and withdrawal through opening 30.

Valve element 40 is illustrated in its slidably displaced open position in Figure 5. In that position, the plastic lubricant can flow through the aperture 38 around boss 42 and through the passages 44, and through the hollow spring retainer 50 into reservoir 25.

The upper end of head 32 is adapted for the reception of a lubricant coupling of a standard type grease gun, grease pump or the like, such as an Alemite gun. The top of head 32 is like the conventional button head lubricant fittings, having an annular groove 60 below a smooth circular head 62, to receive the lubricant coupling.

In valves of this type, there are occasions when, upon connecting a lubricant coupling of a lubricant supply source to the fitting, the lubricant pressure is sufficient to fully compress the spring 48. In order to permit lubricant flow through the valve under these conditions it has been customary to provide an annular groove exteriorly of the body of the valve element 40 in combination with a diametral slot formed across the end piloting recess 54.

I have provided for this contingency in a manner which reduces the expense of manufacturing the valve element, as compared to prior art devices, while attaining the desired results of uniform uninterrupted lubricant flow.

As is best illustrated in Figures 6 and 7, I provide a pair of mutually perpendicular diametral end slots 56 and 64 which are preferably of equal depth and both of which are of greater depth than the spring seat recess 54. By this improved construction, when the spring 48 is fully compressed, lubricant can flow from each of the four passages 44 through the channels at the top of slots 56 and 64, downwardly through the center of the spring 48 and the aperture of the retainer 50 into the bore 30 of the screw shank 28. The lubricant flow is thus always uniformly distributed about the valve element 40.

In operation therefore, when it is necessary to replenish the lubricant reservoir, the coupling of a grease gun or pump is attached to head 32 and actuated to force the valve member 40 toward the position shown in Figure 5 in opposition to the force of the spring 48 and thereby permit the introduction of lubricant into the reservoir. After sufficient lubricant has been introduced, the grease gun is removed and the valve member 40 will then return to its closed position illustrated in Figure 2, under the action of spring 48, to close opening 38 and thereby seal the lubricant reservoir at its upper end. When it becomes necessary to apply pressure to the lubricant within the reservoir either for the purpose of lubricating the valve or for jacking the plug from its seat, a wrench may be applied to the non-circular head 32 to rotate lubricant screw 24 to displace it down further into threaded bore 20 to thus force lubricant from the reservoir through the check valve assembly 22.

Turning now to Figures 8 through 14, there is shown a further embodiment of the invention wherein the improved unitary, rugged structure heretofore described is attained by a modified form of construction. The modified lubricant fitting generally indicated by the numeral 70 of Figure 8 comprises a shank 72 having a threaded portion 74 at one end of the shank and integral head portion 76 at the opposite end of shank 72.

As shown in Figures 8 and 9, the exterior surface of head portion 76 is of non-circular cross-section for the reception of a wrench or like turning tool and is connected to shank 72 by smooth conical surface portion 78 which assures maximum strength at the junction of head 76 and shank 72.

Shank 72 is formed with smooth internal axial bore 80 extending inwardly from threaded end 74 and connects with smaller axially aligned threaded bore 82, whose major diameter is substantially equal to bore 80, within conical portion 78. Bore 84 which is substantially a continuation of the minor diameter of threaded bore 82 extends axially through head 76 and is connected at its upper end, as viewed in Figure 9, with smaller diameter coaxial aperture 86. Bore 84 and aperture 86 define internal concave shoulder 88 within and adjacent the upper end of head 76, for a purpose which will appear.

A valve element 90, shown in Figure 12, of generally circular cross-section is axially slidably supported in bore 84, by virtue of integral circumferentially spaced valve ribs 92, and is formed with end boss 94 of a size and shape complementary to aperture 86 into which it fits snugly as a closure for aperture 86 when valve element 90 is in the closed position of Figure 9.

As best seen in Figure 11, in the assembled position of valve element 90 the ribs 92 and the wall of bore 84 define a plurality of independent longitudinal channels 96 through which lubricant can freely pass to the reservoir chamber 25, illustrated in Figure 1. The end of valve element 90 adjacent boss 94 is provided with convex surface shoulder 98 to interfit in sealing relation with concave internal shoulder 88.

Similar to the condition illustrated in Figure 2 as long as valve element 90 is in its closed position with boss 94 disposed within aperture 86 and concave shoulder 88 of the fitting abutting convex opposed surface 98 fluid communication through aperture 86 to channels 96 is prevented.

Valve element 90 provided with shoulder portion 100, axially spaced from the inner end of ribbed portion 92 as by annular groove 102, is provided with circumferential ribs 104 which are substantially longitudinal extensions of ribs 92 so that the spaces therebetween are in longitudinal alignment with the spaces between ribs 92. Inwardly of shoulder portion 100 valve element comprises an integral circular piloting boss 106, of lesser diameter than ribs 104 and 92, having a diametral slot 108 extending axially inwardly from a free end thereof bisecting shoulder 100 and extending into groove 102 substantially to its mid-point, as best seen in Figure 12.

Spring retainer 110 having an axially extending through opening is threaded into bore 82 and abuts an adjacent end of spring 114 to compress the spring and cause a biasing force to closed position on valve element 90, as illustrated in Figure 9. Spring retainer 110 is formed with slots 112 accessible to a screw driver inserted into bore 80 to insert, adjust, or remove retainer 110 from bore 82.

As shown in Figure 9 valve element 90 and spring 114 are small enough to permit their insertion into bore 84 through threaded bore 82. As heretofore noted bore 84 is merely a continuation of the minor diameter of threaded bore 82 which permits one simple drilling operation to form both bores 82 and 84 and merely a simple threading operation to provide the threads of bore 82 for mounting retainer 110.

In the assembled position valve element 90 is mounted in bore 84 with boss 94 fitting into aperture 86 and with piloting boss 106 fitting into the coils at one end of spring 114 to assure proper alignment of the spring 114 and valve element 90. It will readily be seen from Figure 9 that shoulder 100 spaces the abutting adjacent end of spring 114 from the inner end of ribs 92 the distance or width of annular groove 102. This spacing of spring 112 is conjunction with the intersection of slot 108 with annular groove 102 assures free flow of lubricant to reservoir 25 (Figure 2) even though spring 112 may be compressed to its solid length by the pressure of a grease gun, as will hereinafter appear.

Assuming valve element 90 to be in its slidably displaced open position, similar to that illustrated in Figure 5, plastic lubricant, as from a grease gun, can flow through aperture 86, through channels 96, between ribs 92, into annular groove 102, and into slot 108 from which it flows axially through the center of spring 112 to reservoir 25. It will be readily seen that by the improved construction of the valve element 90 herein disclosed lubricant flow is unobstructed even though spring 112 is compressed to its minimum height.

The upper end of integral head 76 is adapted for the reception of a lubricant coupling of a standard type grease gun, grease pump, or the like, such as an Alemite gun. The top of head 76 is like the conventional button head lubricant fittings, having an annular groove 116 below circular head 118 having a smooth rounded periphery 120.

In operation, therefore, as in the embodiment of Figures 1 to 7, when it is necessary to replenish the lubricant reservoir, the coupling of a grease gun or pump is attached to head 76 and actuated to force valve element 90 inwardly in bore 84 in opposition to the force of spring 114 and thereby permits the introduction of lubricant to the reservoir. After sufficient lubricant has been introduced the grease gun is removed and valve element 90 will return to its closed position of Figure 9 under the influence of spring 114 to close aperture 86 and thereby seal the reservoir at its upper end. When it becomes necessary to apply pressure to the lubricant within the reservoir either for the purpose of lubricating the valve or jacking the plug from its seat, a wrench may be applied to the non-circular head 76 to rotate lubricant fitting 70 to displace it down further into the threaded bore of a valve, such as that illustrated in Figure 1, to force lubricant from the reservoir through check valve assembly 22.

It is apparent from the foregoing detailed description that I have provided a compact lubricant fitting in which a head is permanently attached to or integrally formed with the lubricant screw shank, and wherein the head houses an improved check valve mechanism and wherein the head and shank form a rigid, rugged unitary structure which is not subject to damage under any normal blow to which it might be subjected. The component parts are inexpensively fabricated and readily assembled, and the hollow fitting of the invention is interchangeable with the conventional solid tube screw of the Nordstrom patent for example.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hollow lubricant fitting externally threaded adjacent one end and having a check valve chamber at its other end, a check valve within said chamber comprising a valve element having a body portion slidably received within said chamber and having a plurality of longitudinally extending lubricant passages spaced about said valve element, means spaced from said body portion and defining therewith a channel in constant communication with said lubricant passages, a coil spring coaxial with said valve element held in spaced relation to said body portion and channel by said means and biasing said valve element to closed position and a central passage in said valve element extending beyond said means and in constant communication with said channel, whereby lubricant flow through the fitting is maintained even when said spring is solidly compressed.

2. The device as set forth in claim 1 wherein said lubricant passages are defined by a plurality of longitudinally extending ribs slidably supporting said valve element in said chamber and said channel comprises an annular groove at one end of said ribs in constant communication with said lubricant passages and central passage.

3. A hollow lubricant fitting externally threaded adjacent one end having a check valve chamber adjacent its other end and inlet and outlet means to said chamber, a check valve within said chamber comprising a valve element having a plurality of peripherally spaced ribs slidably supporting said valve element in said chamber and defining therebetween and with said chamber a plurality of longitudinally extending lubricant passages, a coil spring coaxial with said valve element in contact with the ends of said ribs biasing said valve element toward its closed position, an annular channel in said ribs in constant communication with said lubricant passages spaced above said contacting end of said spring, and a central passage in said valve element extending above said contacting end of said spring and in constant communication with said channel whereby lubricant flow through the fitting is maintained even when said spring is solidly compressed.

4. In a lubricant fitting, an elongated member having an enlarged lubricant receiving head at one end, an externally threaded section at the other end and a central through bore from end to end, said bore having a reduced opening through the head and the section of said bore within the head being cylindrical inwardly of said opening to define a valve chamber, an internally threaded bore section at the inner end of said chamber, an axially hollow threaded retainer mounted in said threaded bore section, a non-circular valve element shorter than the chamber length slidably mounted in said chamber and having an end part adapted to enter and close said opening, a coil spring compressed between said valve element and said retainer, said valve element being normally closed and adapted to be displaced by lubricant pressure to admit lubricant into said chamber, and said lubricant flowing between the periphery of said valve element and said chamber toward the part of the bore below the retainer, and passage means on said valve element including a central passage extending outwardly toward said opening from the spring contacting end of the valve element to permit passage of lubricant through the interior of the spring even if the spring becomes compressed solid.

5. In a lubricant fitting, a valve element comprising a solid body, a projection of reduced diameter extending from one end of said body, a plurality of circumferentially spaced radial ribs extending longitudinally of said body, an annular groove in said body intermediate the ends of said ribs, said groove having a depth substantially equal to the depths of said ribs and said body being relieved of said ribs for a short section at its other end to provide a coil spring piloting extension, and a laterally open recess in said other end of the body, said recess extending longitudinally into communication with the bottom of said groove.

6. In the lubricant fitting defined in claim 5, said ribs having arcuate outer surfaces all lying in a cylindrical envelope.

7. In a lubricant fitting, an elongated member having an internal longitudinal through bore, an external screw threaded section adjacent one end of said member, the other end of said member having a lubricant head coupling surrounding a lubricant admission opening smaller than said bore, an enlarged wrench receiving body portion adjacent said coupling surrounding an enlarged portion of said bore which defines an internal chamber of larger cross-section than said opening and having an aperture opposite and aligned with said opening, a check valve element longitudinally slidably mounted within said chamber having a longitudinally extending lubricant passage along a first portion thereof and a part adapted to close said opening, a hollow spring retainer removably secured in said aperture, a coil spring compressed between said retainer and a surface on said valve element and surrounding a second portion of said valve element to normally urge said valve element to valve closed position but permitting inward movement of said element away from said opening under lubricant pressure, said second portion of said valve element being formed with a central lubricant passageway, and a lubricant channel connecting said lubricant passage and said central lubricant passageway whereby lubricant flow through the fitting is maintained even when said spring is solidly compressed.

References Cited in the file of this patent

UNITED STATES PATENTS

| 8,251 | Richardson | July 29, 1851 |
| 1,304,328 | Klems | May 20, 1919 |
| 1,345,571 | Yates | July 6, 1920 |
| 1,733,641 | Banfield et al. | Oct. 29, 1929 |
| 1,950,004 | Kreidel | Mar. 6, 1934 |
| 2,025,229 | Dodge | Dec. 24, 1935 |
| 2,077,040 | Creveling | Apr. 13, 1937 |
| 2,259,977 | Kelly | Oct. 21, 1941 |
| 2,431,769 | Parker | Dec. 2, 1947 |